United States Patent
Lee et al.

(10) Patent No.: US 6,975,091 B2
(45) Date of Patent: Dec. 13, 2005

(54) POWER CONTROL UNIT OF FUEL CELL HYBRID VEHICLE

(75) Inventors: Sang-Don Lee, Hwaseong (KR); Tae-Woo Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/322,164

(22) Filed: Dec. 17, 2002

(65) Prior Publication Data

US 2004/0017175 A1  Jan. 29, 2004

(30) Foreign Application Priority Data

Jul. 23, 2002 (KR) .................................. 10-2002-0043233

(51) Int. Cl.[7] ................................................ H02J 7/00
(52) U.S. Cl. ...................................... 320/104; 320/126
(58) Field of Search ......................... 320/104, 126, 320/128, 132, 134, 136, 137, 140, 145; 429/9, 13, 23; 307/139, 140, 141; 180/65.3

(56) References Cited

U.S. PATENT DOCUMENTS 5,760,488 A * 6/1998 Sonntag ..................... 307/10.1
5,816,689 A * 10/1998 Strazzabosco ............... 362/272
5,892,351 A * 4/1999 Faulk .......................... 320/125
6,052,633 A * 4/2000 Fukuyama et al. ........... 701/41
6,255,008 B1 * 7/2001 Iwase ............................ 429/9
6,321,145 B1 * 11/2001 Rajashekara ................. 701/22

FOREIGN PATENT DOCUMENTS

JP          06-124720          6/1994

* cited by examiner

*Primary Examiner*—Donald Sparks
*Assistant Examiner*—Lawrence Luk
(74) *Attorney, Agent, or Firm*—Morgan Lewis & Bockius LLP

(57) ABSTRACT

A power control unit of a fuel cell hybrid vehicle includes a first switching unit, a second switching unit, and a control unit. One terminal of the first switching unit is connected to a fuel cell stack and to an anode of a DC/DC converter in parallel, and the other terminal is connected to an inverter. One terminal of the second switching unit is connected to the inverter and to a cathode of the DC/DC converter in parallel, and the other terminal is connected to a cathode of the fuel cell stack. The control unit switches contact points of the first and the second switching units to selectively supply a voltage from one of the fuel cell stack and a battery to a motor.

13 Claims, 4 Drawing Sheets

POWER CONTROL UNIT OF FUEL CELL HYBRID VEHICLE

FIELD OF THE INVENTION

The present invention relates to a power control unit of a fuel cell hybrid vehicle, and more particularly to a power control unit for controlling the flow of electric power among a fuel cell, a battery, and a motor.

BACKGROUND OF THE INVENTION

A fuel cell is an electrochemical device that converts chemical energy into electric energy. A fuel cell is advantageous because it is highly efficient, emits no noxious fumes (as opposed to existing energy sources), and can use a variety of different fuels. Thus, fuel cells are considered to be a future energy source.

A fuel cell converts chemical energy, which is released by an oxidizing material such as LNG, LPG, methanol, etc., into electric energy through an electrochemical reaction. Fuel cells utilize hydrogen, which is easily generated from natural gas and atmospheric oxygen. The fuel cell can be used as a power source of a vehicle, replacing the existing internal-combustion engine in order to address problems such as increasing energy costs, environmental pollution, and warming of the earth.

A disadvantage of using fuel cells as a power source of a vehicle, however, is that they cannot generate enough power to drive a motor until after the motor is activated at an initial cold start. To compensate for this disadvantage, a hybrid vehicle is being developed that uses both a battery and a fuel cell, in some cases concurrently. These vehicles are typically referred to as fuel cell hybrid vehicles.

One problem with a fuel cell hybrid vehicle is that there is a danger that electromotive force generated from a motor during deceleration or shut-down of the vehicle will potentially flow into the fuel cell. To avoid this from occurring, conventional fuel cell hybrid vehicles use a simple contactor as a safety device between the fuel cell and the vehicle controller. No separate device for managing a specific voltage path supplying high voltage to the motor (i.e., a driving source) is provided.

Also, in a conventional fuel cell hybrid vehicle with a power connection unit, it is difficult to control polarity of the power supply unit through a control program. Controlling polarity is complex because the control program for the power connection unit must control a cathode (−) and an anode (+) of the power supply unit simultaneously, and the control program cannot determine whether the power supplied to the motor is power from the fuel cell or power from the battery.

SUMMARY OF THE INVENTION

In a preferred embodiment of the present invention, the power control unit of a fuel cell hybrid vehicle includes a first switching unit, a second switching unit, and a control unit. One terminal of the first switching unit is connected to an anode of the fuel cell stack and an anode of a DC/DC converter in parallel, and the other terminal is connected to an inverter. One terminal of the second switching unit is connected to the inverter and a cathode of the DC/DC converter in parallel, and the other terminal is connected to a cathode of the fuel cell stack. The control unit switches contact points of the first and the second switching units to selectively supply a voltage from one of the fuel cell stack and a battery to a motor.

Preferably, the power control unit also comprises a diode connected forward of the anode of the fuel cell stack for blocking flow of electromotive force of the motor into the fuel cell stack.

Also, the first and the second switching units preferably include a plurality of on/off switching elements, and the switching elements of the first and the second switching units are preferably relays, which are switched on/off depending on a control signal from the control unit. In addition, the relays of both the first and the second switching units are preferably connected to each other in parallel.

The control unit preferably controls switching of the first and the second switching units so that the motor is driven by power generated from the fuel cell stack. Or, the control unit preferably controls switching of the first and the second switching units so that the motor is driven by power generated from the battery. Alternatively, the control unit preferably controls switching of the first and the second switching units so that power generated from the fuel cell stack is supplied to the battery as charging power.

In addition, the control unit preferably controls switching of the first and the second switching units so that power generated from the fuel cell stack and power generated from the battery are supplied to the motor concurrently.

In another preferred embodiment, the power control unit further preferably includes a fuse protecting the battery from overcurrent, which is connected between the first switching unit and the DC/DC converter to block flow of electromotive force into the battery.

In yet another preferred embodiment, the present invention is a method for selectively providing drive power to a load in a fuel cell hybrid vehicle having a fuel cell stack and a battery. The method includes receiving a first control signal at a controller. Then, based on the first control signal, a first action of opening or closing a first switching unit is conducted. The first switching unit has one terminal in electrical communication with an anode the fuel cell stack and with an anode of the battery in parallel, and a second terminal in electrical communication with the load.

Also, based on the first control signal, a second action of opening or closing a second switching unit is conducted. The second switching unit has a first terminal in electrical communication with the load and with a cathode of the battery in parallel, and a second terminal in electrical communication with a cathode of the fuel cell stack. In this manner, the first control signal determines which of the fuel cell stack or the battery provides the drive power to the load.

Preferably, when the first action is closing and the second action is closing, the drive power is provided from the fuel cell stack to the load. And, when the first action is closing and the second action is opening, the drive power is provided from the battery to the load.

Yet another preferred embodiment of the present invention is a power control unit of a fuel cell hybrid vehicle comprising a first switching unit, a second switching unit, and a control unit. The first switching unit has one terminal in electrical communication with an anode of a fuel cell stack and with an anode of a battery in parallel, and a second terminal in electrical communication with a load. The second switching unit has one terminal in electrical communication with the load and with a cathode of the battery in parallel, and a second terminal in electrical communication with a cathode of the fuel cell stack. The control unit is for switching contact points of the first and second switching units to selectively supply a voltage from one of the fuel cell stack and the battery to the load.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms, and should not be construed as limited to the embodiments set forth herein.

Figure 1:
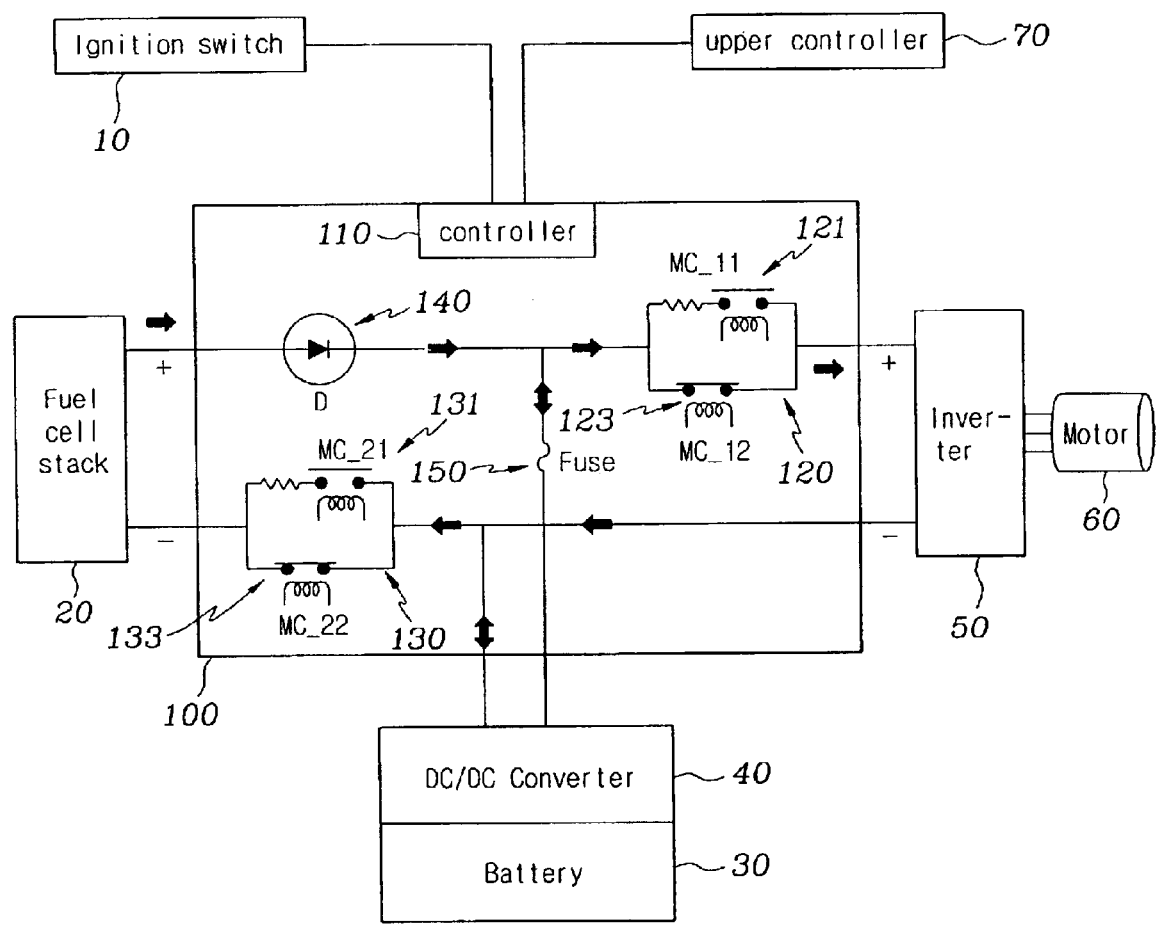
FIG. 1 is a schematic illustrating a power connection unit of a fuel cell hybrid vehicle, according to a preferred embodiment the present invention.

As shown FIG. 1, a power connection unit 100 of a fuel cell hybrid vehicle according to a preferred embodiment of the present invention includes a controller 110, a first contactor relay 120, a second contactor relay 130, a diode 140, and a fuse 150. Controller 110 preferably comprises a suitable processor and associated hardware and software as may be selected and programmed by a person of ordinary skill in the art to execute the control functions as described herein.

The controller 110 is enabled or disabled depending on a start on/off signal applied from an ignition switch 10. Also, when an operating power supply corresponding to a "start-on" signal of the ignition switch 10 is supplied to the controller, the controller directs power generated in a fuel cell stack 20, or in a battery 30 and processed through a DC/DC converter 40, to be supplied to a motor 60. The source of the provided power (i.e., fuel cell or battery) is determined by a control signal from an upper controller 70. Additionally, the controller directs that battery 30 is charged by a voltage generated in the fuel cell stack 20, and by regenerative braking energy generated while braking with the motor.

The first contactor relay 120 connects the fuel cell stack 20, and the DC/DC converter 40 connected thereto, in parallel with the anode (+) of an inverter 50. The first contactor relay includes a first relay 121 and a second relay 123. As shown in the figure, the first relay 121 and the second relay 123 are connected to each other in parallel. Each relay includes contact points that are switched, depending on a control signal from the controller 110, to supply output power from the fuel cell stack 20 to the inverter 50, or to supply output power from the battery 30 to the inverter 50.

The second contactor relay 130 connects the cathode (−) of the inverter 50, and the DC/DC converter 40 connected thereto, in parallel with the cathode (−) of the fuel cell stack 20. The second contactor relay includes a first relay 131 and a second relay 133. Like the relays of the first contactor relay, each relay contains contact points that are switched, depending on the control signal of the controller 110, to supply output power from the fuel cell stack 20 to the inverter 50, or to supply output power from the battery 30 to the inverter 50.

The diode 140 preferably has a large capacitance, and is connected forward of the anode (+) of the fuel cell stack 20 to block flow of a high-voltage electromotive force generated in the motor 60 from entering the fuel cell stack 20. Also, fuse 150, connected to an anode (+) of the DC/DC converter 40, is designed to open if an overcurrent is generated in the load or at an inflow of the electromotive force, thereby protecting the battery 30 and the entire system.

Figure 2:
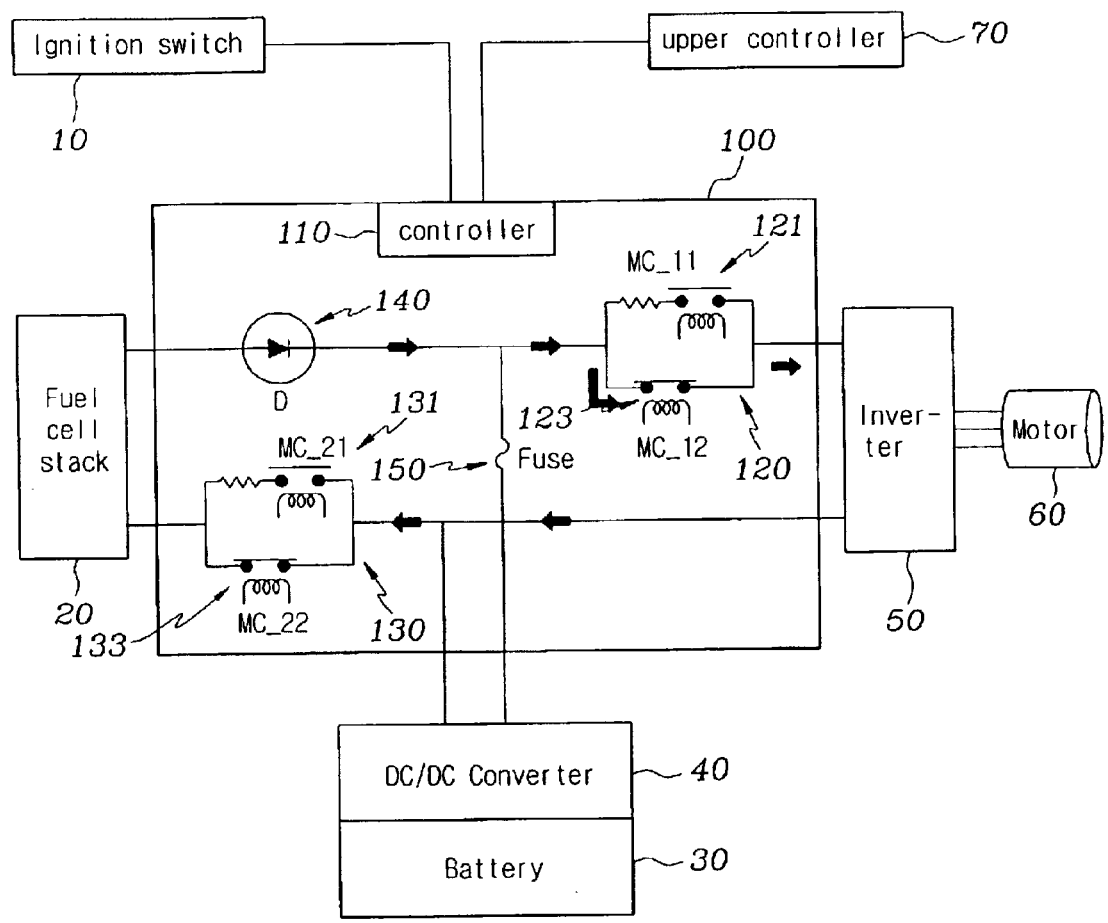
FIG. 2 is a schematic showing voltage flow for providing driving power when a motor is driven only by the power of a fuel cell in the power connection unit of FIG. 1, according to a preferred embodiment of the present invention.

Operation of the power connection unit of a preferred embodiment of the present invention, as identified above, is performed as follows. Referring to FIG. 2, when the motor 60 is to be driven only by the fuel cell stack 20, the controller 110 receives a control signal from the upper controller 70 to drive the motor with only voltage generated from the fuel cell stack. This occurs when the controller is in a state whereby the controller receives a "start-on" signal through the start-on contact point of the ignition switch 10. Then, the controller 110 switches the contact points of the first and the second contactor relays 120 and 130 so that the motor is driven only with power generated from the fuel cell stack.

In other words, as can be seen in the figure, the controller 110 opens the contact point of the first relay 121 and closes the contact point of the second relay 123 in the first contactor relay 120. The controller 110 also opens the contact point of the first relay 131 and closes the contact point of the second relay 133 in the second contactor relay 130. Accordingly, a path of voltage/current connecting the fuel cell stack 20 to the inverter 50 is formed to drive the motor 60 based on pulse width modulation (PWM) switching of the inverter.

Figure 3:
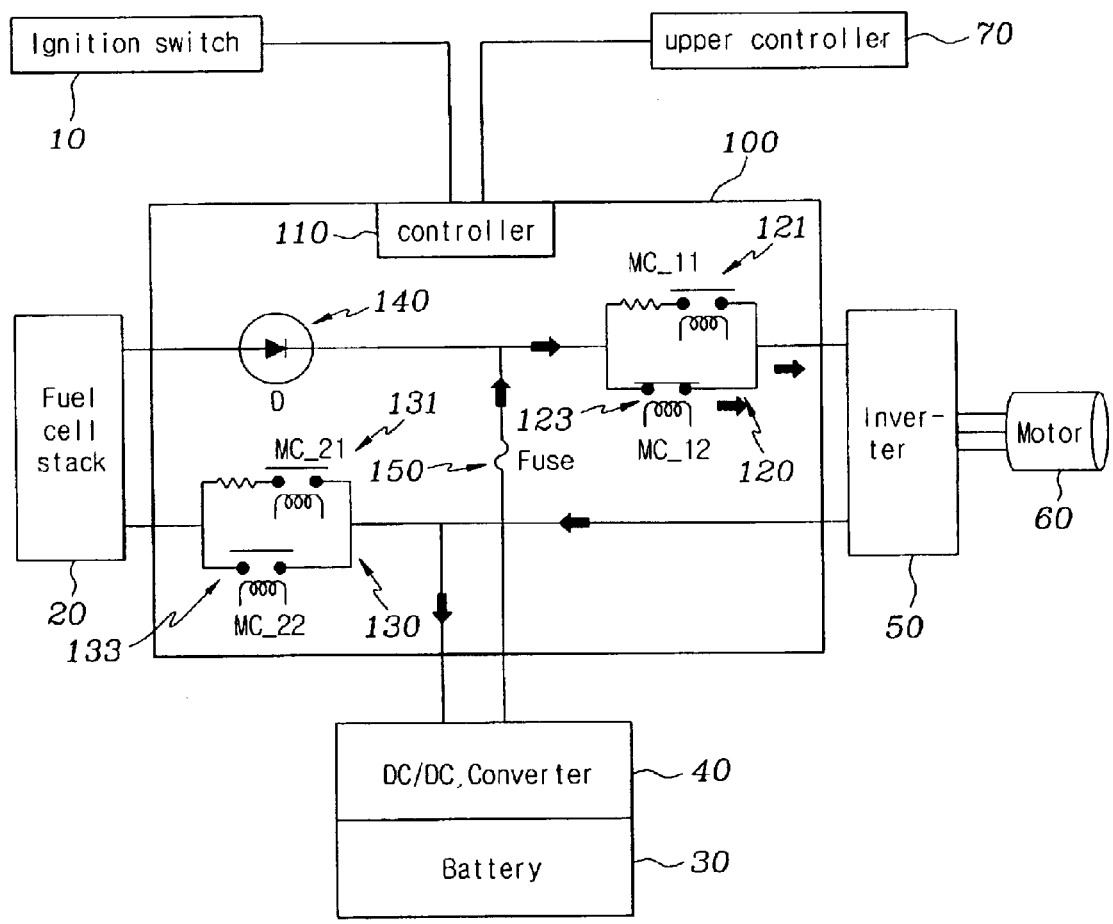
FIG. 3 is a schematic showing voltage flow for providing driving power when a motor is driven only by the power of a battery in the power connection unit of FIG. 1, in accordance with a preferred embodiment of the present invention.

Referring to FIG. 3, when only battery power from the battery 30 is used for an initial cold start of the motor 60, the controller 110 receives a control signal from the upper controller 70 to drive the motor with only voltage generated from the battery. This occurs when the controller is in a state whereby the controller receives a "start-on" signal through the start-on contact point of the ignition switch 10. Then, the controller 110 switches the contact points of the first and the second contactor relays 120 and 130 so that the motor is driven only with power generated from the battery.

In other words, as can be seen in the figure, the controller 110 opens the contact point of the first relay 121 and closes the contact point of the second relay 123 in the first contactor relay 120. The controller also opens the contact point of the first relay 131 and the contact point of the second relay 133 in the second contactor relay 130. Accordingly, a path of voltage/current connecting the battery 30 to the inverter 50 is formed to drive the motor 60 based on PWM switching of the inverter.

Figure 4:
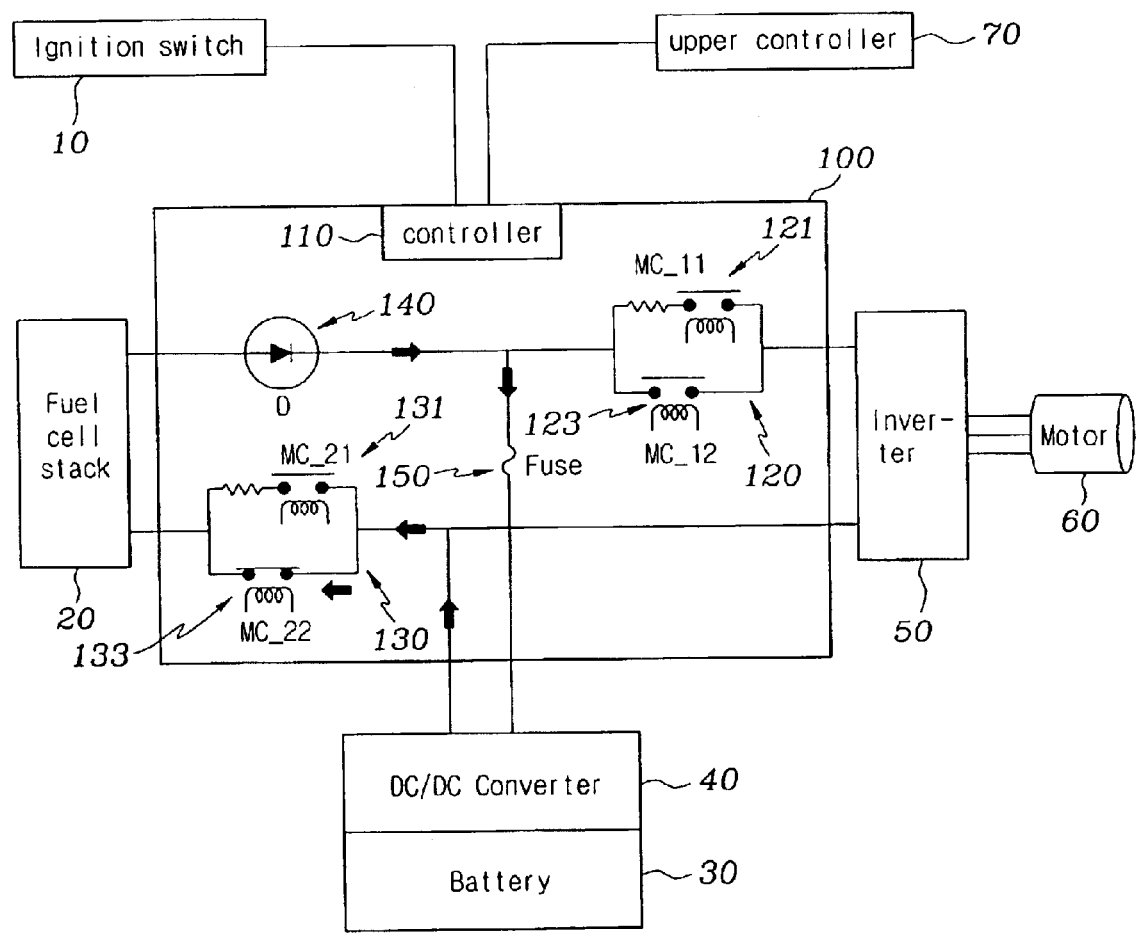
FIG. 4 is a schematic showing voltage flow at the time of charging a battery with fuel cell power in the power connection unit of FIG. 1, in accordance with another preferred embodiment of the present invention.

Referring to FIG. 4, when power generated from the fuel cell stack 20 is not used to power the motor 60, and is instead only used to charge the battery 30, the controller 110 receives a control from the upper controller 70 to supply voltage generated from the fuel cell stack to the battery as charging power without using it to power the motor. This occurs when the controller 110 is in a state whereby the controller receives a "start-on" signal through the start-on contact point of the ignition switch 10. Then, the controller 110 switches the contact points of the first and the second contactor relays 120 and 130 so that the power generated from the fuel cell stack is used only to charge the battery.

In other words, as can be seen in the figure, the controller 110 opens the contact point of the first relay 121 and the contact point of the second relay 123 in the first contactor relay 120. The controller also opens the contact point of the first relay 131 and closes the contact point of the second relay 133 in the second contactor relay 130. Accordingly, a path of voltage/current connecting the fuel cell stack 20 with the battery 30 is formed to supply the power generated from the fuel cell stack 20 to the battery 30, thereby charging the battery.

In another preferred embodiment (not shown), the controller 00 provides power from the fuel cell stack 20 and the battery 30 to the motor 60 concurrently. This occurs when the controller 110 receives a control signal from the upper controller 70 to supply voltage generated from both the fuel cell stack and the battery to the motor. Also, the controller must be in a state whereby the controller receives a "start-on" signal through the start-on contact point of the ignition switch 10. Then, the controller 110 switches the contact points of the first and the second contactor relays 120 and 130 so that the power generated from the fuel cell stack 20 and from the battery 30 are both used to drive the motor 60. The proportion of each type of power to the total motor drive power is determined by the controller 110.

As described above, the present invention provides stability in the operations of loads by supplying power to the loads concurrently or selectively, lo and provides convenience in control of voltages by separate control for each electrode. Note that, although embodiments of the present invention have been described in the context of supplying driving power to the motor 60, the driving power can also be selectively connected to a variety of load devices equipped in the fuel cell hybrid vehicle to maintain stable operations.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A method for selectively providing drive power to a load in a fuel cell hybrid vehicle having a fuel cell stack and a battery, the method comprising:
   receiving a first control signal at a controller;
   based on the first control signal, conducting a first action of opening or closing a first switching unit, the first switching unit having one terminal in electrical communication with an anode of the fuel cell stack and with an anode of the battery in parallel, and a second terminal in electrical communication with the load;
   based on the first control signal, conducting a second action of opening or closing a second switching unit, the second switching unit having a first terminal in electrical communication with the load and with a cathode of the battery in parallel, and a second terminal in electrical communication with a cathode of the fuel cell stack;
   wherein the first control signal determines which of the fuel cell stack or the battery provides the drive power to the load, and wherein, when the first action is closing and the second action is closing, the drive power is provided from the fuel cell stack to the load.

2. The method of claim 1, wherein, when the first action is closing and the second action is closing, the drive power is provided from the fuel cell stack to the load.

3. The method of claim 1, wherein, when the first action is closing and the second action is opening, the drive power is provided from the battery to the load.

4. A method for selectively providing drive power to a load in a fuel cell hybrid vehicle having a fuel cell stack and a battery, the method comprising:
   receiving a first control signal at a controller;
   based on the first control signal, conducting a first action of opening or closing a first switching unit, the first switching unit having one terminal in electrical communication with an anode of the fuel cell stack and with an anode of the battery in parallel, and a second terminal in electrical communication with the load; and
   based on the first control signal, conducting a second action of opening or closing a second switching unit, the second switching unit having a first terminal in electrical communication with the load and with a cathode of the battery in parallel, and a second terminal in electrical communication with a cathode of the fuel cell stack;
   wherein the first control signal determines which of the fuel cell stack or the battery provides the drive power to the load, and wherein, when the first action is closing and the second action is opening, the drive power is provided from the battery to the load.

5. A power control unit of a fuel cell hybrid vehicle, comprising:
   a first switching unit having one terminal connected to an anode of a fuel cell stack and to an anode of a DC/DC converter in parallel, and having a second terminal connected to an inverter;
   a second switching unit having one terminal connected to the inverter and to a cathode of the DC/DC converter in parallel, and having a second terminal connected to a cathode of the fuel cell stack; and
   a control unit for switching contact points of the first and the second switching units to selectively supply a voltage from one of the fuel cell stack and a battery to a motor, wherein switching elements of the first and the second switching units are relays, which are switched on/off depending on a control signal from the control unit.

6. The power control unit of claim 5, further comprising a diode connected forward of the anode of the fuel cell stack for blocking flow of electromotive force of the motor into the fuel cell stack.

7. The power control unit of claim 5, wherein the relays of both the first and the second switching units are connected to each other in parallel.

8. The power control unit of claim 5, wherein the control unit controls switching of the first and the second switching units so that the motor is driven by power generated from the fuel cell stack.

9. The power control unit of claim 5, wherein the control unit controls switching of the first and the second switching units so that the motor is driven by power generated from the battery.

10. The power control unit of claim 5, wherein the control unit controls switching of the first and the second switching units so that power generated from the fuel cell stack is supplied to the battery as charging power.

11. A power control unit of a fuel cell hybrid vehicle, comprising:

a first switching unit having one terminal connected to an anode of a fuel cell stack and to an anode of a DC/DC converter in parallel, and having a second terminal connected to an inverter;

a second switching unit having one terminal connected to the inverter and to a cathode of the DC/DC converter in parallel, and having a second terminal connected to a cathode of the fuel cell stack; and a control unit for switching contact points of the first and the second switching units to selectively supply a voltage from one of the fuel cell stack and a battery to a motor.

12. A method for selectively providing drive power to a load in a fuel cell hybrid vehicle having a fuel cell stack and a battery, the method comprising:

receiving a first control signal at a controller;

based on the first control signal, conducting a first action of opening or closing a first switching unit, the first switching unit having one terminal in electrical communication with an anode of the fuel cell stack and with an anode of the battery in parallel, and a second terminal in electrical communication with the load; and based on the first control signal, conducting a second action of opening or closing a second switching unit, the second switching unit having a first terminal in electrical communication with the load and with a cathode of the battery in parallel, and a second terminal in electrical communication with a cathode of the fuel cell stack;

wherein the first control signal determines which of the fuel cell stack or the battery provides the drive power to the load.

13. A power control unit of a fuel cell hybrid vehicle comprising:

a first switching unit having one terminal in electrical communication with an anode of a fuel cell stack and with an anode of a battery in parallel, and having a second terminal in electrical communication with a load;

a second switching unit having one terminal in electrical communication with the load and with a cathode of the battery in parallel, and having a second terminal in electrical communication with a cathode of the fuel cell stack; and a control unit for switching contact points of the first and the second switching units to selectively supply a voltage from one of the fuel cell stack and the battery to the load.

* * * * *